United States Patent
Suzuki

(10) Patent No.: US 9,903,412 B2
(45) Date of Patent: Feb. 27, 2018

(54) TAPERED ROLLER BEARING

(71) Applicant: JTEKT CORPORATION, Osaka-shi, Osaka (JP)

(72) Inventor: Akiyuki Suzuki, Nagoya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/296,482

(22) Filed: Oct. 18, 2016

(65) Prior Publication Data

US 2017/0122368 A1    May 4, 2017

(30) Foreign Application Priority Data

Oct. 30, 2015  (JP) ................... 2015-213956

(51) Int. Cl.
| | |
|---|---|
| *F16C 19/36* | (2006.01) |
| *F16C 33/56* | (2006.01) |
| *F16C 33/46* | (2006.01) |
| *F16C 33/80* | (2006.01) |
| *F16C 33/66* | (2006.01) |

(52) U.S. Cl.
CPC ........ *F16C 19/364* (2013.01); *F16C 33/4623* (2013.01); *F16C 33/4635* (2013.01); *F16C 33/4676* (2013.01); *F16C 33/56* (2013.01); *F16C 33/664* (2013.01);
(Continued)

(58) Field of Classification Search
CPC .. F16C 19/305; F16C 19/364; F16C 33/4623; F16C 33/4635; F16C 33/4676; F16C 33/498; F16C 33/56; F16C 33/80; F16C 33/664; F16C 33/6681; F16C 33/6674; F16C 2220/04; F16C 2240/40

USPC ........ 384/477, 480, 526–527, 560, 564–565, 384/571–572, 576
See application file for complete search history.

(56) References Cited

U.S. PATENT DOCUMENTS 2,071,628 A  *  2/1937  Hedgcock ............... B60B 37/06
                                                  295/42.2
3,989,326 A  *  11/1976  Hormann ............... F16C 19/364
                                                  384/572
(Continued)

FOREIGN PATENT DOCUMENTS

EP          1785638 A2  *  5/2007  ............ F16C 33/383
EP          1746298 A4  *  8/2007  ............ F16C 19/364
(Continued)

*Primary Examiner* — Marcus Charles
(74) *Attorney, Agent, or Firm* — Oliff PLC

(57) ABSTRACT

A tapered roller bearing includes: an inner ring including an inner raceway surface tapered so that the inner raceway surface increases in diameter from a first side to a second side; an outer ring including an outer raceway surface tapered so that the outer raceway surface increases in diameter from the first side to the second side; a plurality of tapered rollers disposed in an annular space defined between the inner ring and the outer ring; and an annular cage retaining the tapered rollers. The cage includes: a small diameter annular portion; a large diameter annular portion; and a plurality of cage bars connecting the small and large diameter annular portions. An outer clearance is defined between the outer ring and the cage and between circumferentially adjacent ones of the tapered rollers. The outer clearance has a cross-sectional area increasing from the second side to the first side.

11 Claims, 4 Drawing Sheets

(52) U.S. Cl.
CPC .......... *F16C 33/6681* (2013.01); *F16C 33/80* (2013.01); *F16C 33/4629* (2013.01); *F16C 2220/04* (2013.01)

(56) References Cited

U.S. PATENT DOCUMENTS

| | | | | |
|---|---|---|---|---|
| 4,425,011 A * | 1/1984 | Cunningham | ........ | F16C 19/364 384/571 |
| 4,541,738 A * | 9/1985 | Leibensperger | ...... | F16C 19/364 184/31 |
| 4,664,537 A * | 5/1987 | Ascheron | .............. | F16C 19/364 384/470 |
| 4,812,058 A * | 3/1989 | Hofmann | .............. | F16C 19/364 384/563 |
| 4,824,265 A * | 4/1989 | Hofmann | .............. | F16C 19/364 384/560 |
| 6,443,625 B1 * | 9/2002 | Nogi | ....................... | F16C 19/28 384/572 |
| 7,350,978 B2 * | 4/2008 | Matsuyama | .......... | F16C 19/364 384/571 |
| 7,722,257 B2 * | 5/2010 | Tabata | .................. | F16C 19/364 384/571 |
| 7,871,201 B2 * | 1/2011 | Ohshima | ............... | F16C 19/364 384/564 |
| 8,356,945 B2 * | 1/2013 | Mason | .................... | B61F 15/12 384/560 |
| 8,465,211 B2 * | 6/2013 | Dougherty | ............ | B60B 27/001 384/477 |
| 8,596,877 B2 * | 12/2013 | Kanbori | ................. | B60B 35/18 384/571 |
| 2005/0201650 A1 | 9/2005 | Matsuyama et al. | | |

FOREIGN PATENT DOCUMENTS

| | | | | |
|---|---|---|---|---|
| JP | 2005-257048 A | | 9/2005 | |
| JP | 2008298230 A | * | 12/2008 | ............ F16C 19/364 |
| JP | 5532157 B2 | * | 6/2014 | .......... F16C 33/4635 |
| JP | 2015-052349 A | | 3/2015 | |
| WO | WO-2010005007 A1 | * | 1/2010 | .......... F16C 33/4635 |

* cited by examiner

US 9,903,412 B2

TAPERED ROLLER BEARING

INCORPORATION BY REFERENCE

The disclosure of Japanese Patent Application No. 2015-213956 filed on Oct. 30, 2015 including the specification, drawings and abstract is incorporated herein by reference in its entirety.

BACKGROUND OF THE INVENTION

1. Field of the Invention

The invention relates to tapered roller bearings.

2. Description of Related Art

Although compact in size, tapered roller bearings are capable of supporting large radial and axial loads and usable in high speed rotation applications. Thus, tapered roller bearings are used for a wide range of purposes.

As illustrated in FIG. 6, a tapered roller bearing 90 includes an inner ring 99, an outer ring 98, a plurality of tapered rollers 96, and an annular cage 95 (see Japanese Patent Application Publication No. 2015-52349 (JP 2015-52349 A)). The inner ring 99 includes an inner raceway surface 99a tapered so that the inner ring 99 increases in outside diameter from a first axial side S1 to a second axial side S2. The outer ring 98 includes an outer raceway surface 98a tapered so that the outer ring 98 increases in bore diameter from the first axial side S1 to the second axial side S2. The tapered rollers 96 are provided in an annular space 97 defined between the inner raceway surface 99a and the outer raceway surface 98a. The cage 95 retains the tapered rollers 96.

Rotation of the tapered roller bearing 90 produces a pumping effect by which lubricant flows through the inner space of the tapered roller bearing 90 (i.e., the annular space 97) from the first axial side S1 to the second axial side S2 (see the arrows J in FIG. 6). Unfortunately, such a pumping effect may increase lubricant agitation resistance during bearing rotation, which results in an increase in torque, or may discharge the lubricant from the first axial side S1 to the second axial side S2, causing a lubricant shortage in a portion of the tapered roller bearing 90 on the first axial side S1 where the lubricant is necessary.

SUMMARY OF THE INVENTION

An object of the invention is to provide a tapered roller bearing that suppresses lubricant from flowing from a first axial side to a second axial side through an annular space defined between an inner ring and an outer ring or allows the lubricant to flow from the second axial side to the first axial side through the annular space.

A tapered roller bearing according to an aspect of the invention includes an inner ring, an outer ring, a plurality of tapered rollers, and an annular cage. The inner ring is provided at its outer periphery with an inner raceway surface. The inner raceway surface is tapered so that the inner ring increases in outside diameter from a first axial side to a second axial side. The outer ring is provided at its inner periphery with an outer raceway surface. The outer raceway surface is tapered so that the outer ring increases in bore diameter from the first axial side to the second axial side. The tapered rollers are disposed in an annular space defined between the inner ring and the outer ring. The tapered rollers are configured to roll along the inner raceway surface and the outer raceway surface. The annular cage retains the tapered rollers. The cage includes a small diameter annular portion, a large diameter annular portion, and a plurality of cage bars. The small diameter annular portion is located on the first axial side with respect to the tapered rollers. The large diameter annular portion is located on the second axial side with respect to the tapered rollers. The cage bars connect the small diameter annular portion and the large diameter annular portion to each other. An outer clearance is defined between the outer ring and the cage and between circumferentially adjacent ones of the tapered rollers. The outer clearance has a cross-sectional area increasing from the second axial side to the first axial side.

BRIEF DESCRIPTION OF THE DRAWINGS

The foregoing and further features and advantages of the invention will become apparent from the following description of example embodiments with reference to the accompanying drawings, wherein like reference characters are used to represent like elements and wherein.

DETAILED DESCRIPTION OF EMBODIMENTS

Figure 1:
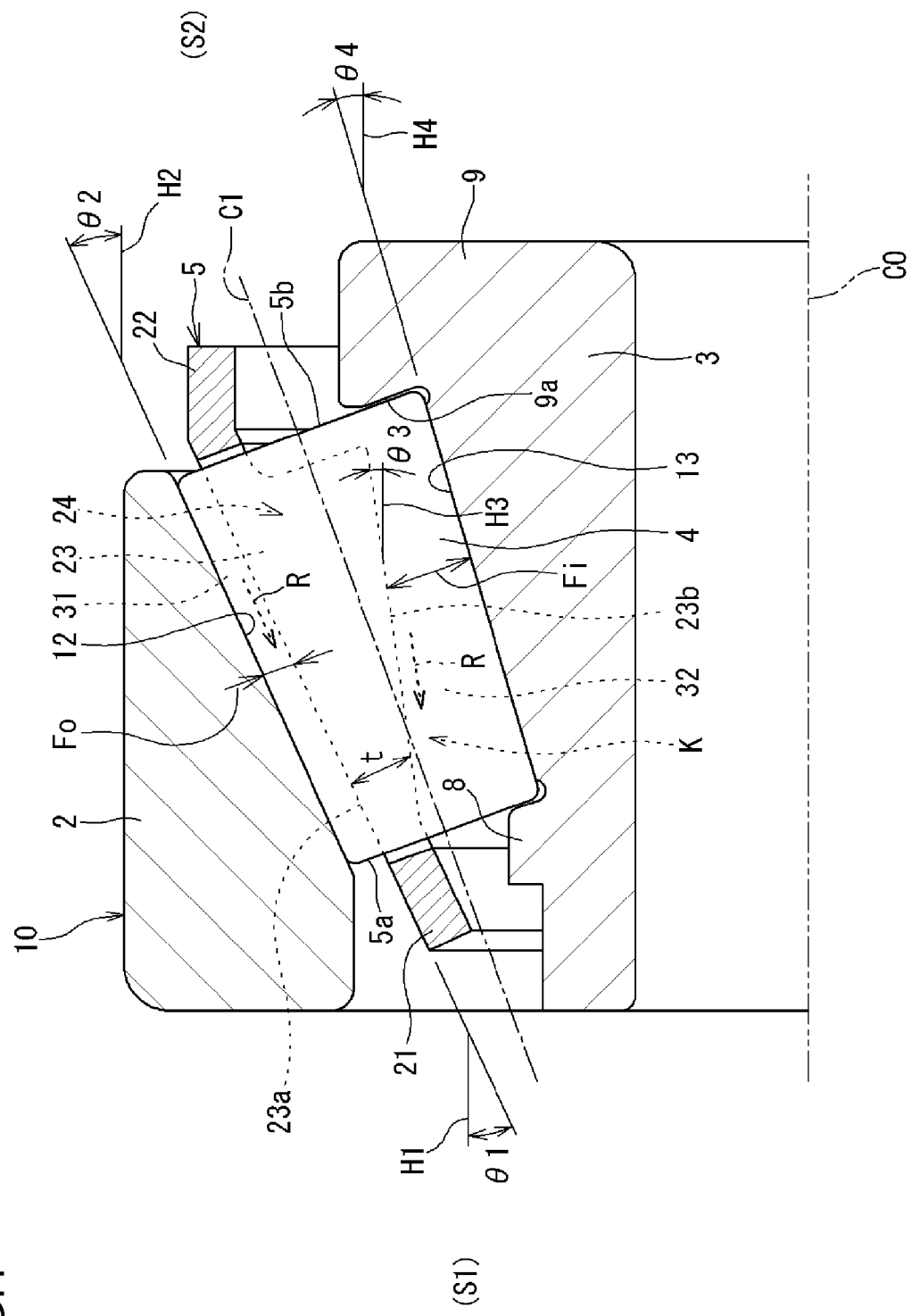
FIG. 1 is a cross-sectional view of a tapered roller bearing according to an embodiment of the invention.

Embodiments of the invention will be described below with reference to the drawings. FIG. 1 is a cross-sectional view of a tapered roller bearing 10 according to an embodiment of the invention. The tapered roller bearing 10 is used in an automobile transmission, for example. In such usage, although not illustrated, a shaft that rotates together with a gear is rotatably supported by the tapered roller bearing 10 in a transmission housing. The housing stores lubricant (e.g., oil) used to lubricate the gear. The lubricant is also used to lubricate the tapered roller bearing 10. The tapered roller bearing 10, which will be described below, may find other applications.

The tapered roller bearing 10 includes an inner ring 3, an outer ring 2, a plurality of tapered rollers 4, and a cage 5. The inner ring 3, the outer ring 2, and the cage 5 are annular members having a common axis C0 serving as the center line of these members.

The inner ring 3 is made of, for example, bearing steel or steel for machine structural use. The inner ring 3 is provided at its outer periphery with an inner raceway surface 13 along which the tapered rollers 4 roll. The inner raceway surface 13 is tapered so that the inner ring 3 increases in outside diameter from a first axial side S1 (which is the left side of FIG. 1) to a second axial side S2 (which is the right side of FIG. 1). In the following description, the first axial side S1 will be simply referred to as a "first side S1", and the second axial side S2 will be simply referred to as a "second side S2". The inner ring 3 includes: a cone front face rib 8 (hereinafter referred to as a "small rib 8"); and a cone back face rib 9 (hereinafter referred to as a "large rib 9"). The small rib 8 is provided on the first side S1 relative to the inner raceway surface 13 and protrudes radially outward. The large rib 9 is provided on the second side S2 relative to the inner raceway surface 13 and protrudes radially outward.

The outer ring 2 is also made of, for example, bearing steel or steel for machine structural use similarly to the inner ring 3. The outer ring 2 is provided at its inner periphery with an outer raceway surface 12 along which the tapered rollers 4 roll. The outer raceway surface 12 faces the inner raceway surface 13. The outer raceway surface 12 is tapered so that the outer ring 2 increases in bore diameter from the first side S1 to the second side S2.

Each tapered roller 4 is made of, for example, bearing steel. Each tapered roller 4 is provided in an annular space K defined between the inner ring 3 and the outer ring 2, so that each tapered roller 4 is allowed to roll along the inner raceway surface 13 and the outer raceway surface 12. Rotation of the tapered roller bearing 10 causes each tapered roller 4 to rotate around its center line C1 while revolving around the axis C0 along the raceway surfaces 12 and 13. Each tapered roller 4 includes: a small end face 5a located on the first side S1 and having a small diameter; and a large end face 5b located on the second side S2 and having a large diameter. Each large end face 5b is in contact with a rib surface 9a of the large rib 9 of the inner ring 3.

The tapered roller bearing 10 is provided with the cage 5, with the tapered rollers 4 disposed in the annular space K. The cage 5 retains the tapered rollers 4. The cage 5 includes a small diameter annular portion 21, a large diameter annular portion 22, and a plurality of cage bars 23. The small diameter annular portion 21 is located on the first side S1 with respect to the tapered rollers 4. The large diameter annular portion 22 is located on the second side S2 with respect to the tapered rollers 4. The cage bars 23 connect the small diameter annular portion 21 and the large diameter annular portion 22 to each other. The large diameter annular portion 22 is larger in outside diameter than the small diameter annular portion 21. In the present embodiment, the large diameter annular portion 22 is also larger in bore diameter than the small diameter annular portion 21. The cage bars 23 are spaced from each other in a circumferential direction. A space is defined between the small diameter annular portion 21 and the large diameter annular portion 22 and between any two of the cage bars 23 adjacent to each other in the circumferential direction. This space serves as a pocket 24 to hold (or retain) an associated one of the tapered rollers 4. As used herein, the term "circumferential direction" refers to the direction of rotation around the axis C0 of the tapered roller bearing 10. The cage 5 may be made of metal. In the present embodiment, however, the cage 5 is made of resin (or more specifically, synthetic resin). This means that the cage 5 may be formed by injection molding. The cage 5 is readily formable when made of resin.

Figure 2:
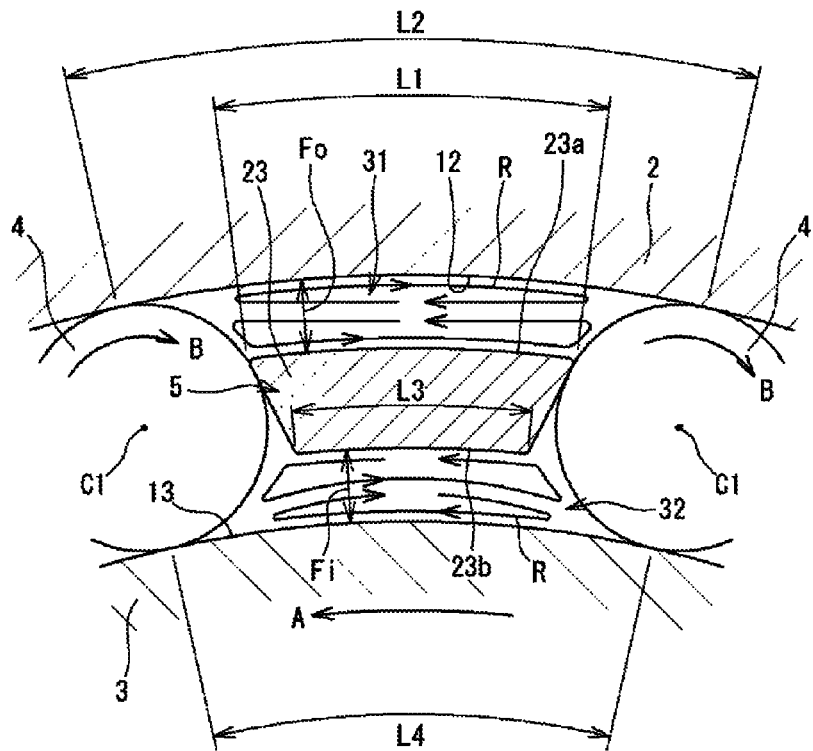
FIG. 2 is a partial cross-sectional view of the tapered roller bearing as viewed along the center lines of tapered rollers disposed between an inner ring and an outer ring.

FIG. 2 is a partial cross-sectional view of the tapered roller bearing 10 as viewed along the center lines C1 of the tapered rollers 4 disposed between the inner ring 3 and the outer ring 2. An outer clearance 31 is defined between the inner peripheral surface (i.e., the outer raceway surface 12) of the outer ring 2 and a radially outer surface 23a of the cage 5 (i.e., the radially outer surface 23a of each cage bars 23) and between paired ones of the tapered rollers 4 circumferentially adjacent to each other. As illustrated in FIG. 1, each outer clearance 31 includes a spacing Fo between the outer ring 2 (or more specifically, the outer raceway surface 12) and the cage 5 (or more specifically, the radially outer surface 23a of each cage bars 23). The spacing Fo increases from the second side S2 to the first side S1. As illustrated in FIG. 2, each radially outer surface 23a has a circumferential length L1 in the associated outer clearance 31. The circumferential length L1 decreases from the second side S2 to the first side S1. The outer raceway surface 12 has a circumferential length L2 between adjacent ones of the tapered rollers 4. The circumferential length L2 decreases from the second side S2 to the first side S1. The spacing Fo, however, largely increases from the second side S2 to the first side S1. Consequently, each outer clearance 31 increases from the second side S2 to the first side S1.

In the cross section illustrated in FIG. 1, the outer raceway surface 12 has a straight shape from the second side S2 to the first side S1. In the cross section illustrated in FIG. 1, the radially outer surface 23a has a straight shape from the second side S2 to the first side S1. Thus, the spacing Fo between the outer ring 2 and the cage 5 gradually (or continuously) increases from the second side S2 to the first side S1. Each outer clearance 31 gradually (or continuously) increases in cross-sectional area from the second side S2 to the first side S1 accordingly. The cross-sectional area of each outer clearance 31 is the area of its cross section perpendicular to the center lines C1 of the associated tapered rollers 4. The spacing Fo corresponds to the length of the cross section perpendicular to the center lines C1 of the associated tapered rollers 4. Each radially outer surface 23a may be modified in shape or may have any shape other than a straight shape, as long as the spacing Fo gradually increases or more specifically, each outer clearance 31 gradually increases in cross-sectional area in the above-described manner.

Rotation of the tapered roller bearing 10 (which means rotation of the inner ring 3 in this embodiment) produces centrifugal force that will cause the lubricant in the annular space K (see FIG. 1) to flow from the first side S1 to the second side S2 along the outer raceway surface 12. As illustrated in FIG. 2, lubricant R, however, is viscous and thus circulates through each outer clearance 31 in the tapered roller bearing 10 according to this embodiment in conjunction with movement of the tapered rollers 4 that rotate in the direction of the arrows B while revolving in the direction of the arrow A. As illustrated in FIG. 1, the spacing Fo between the outer ring 2 and the cage 5 increases from the second side S2 to the first side S1 in each outer clearance 31. Each outer clearance 31 increases in cross-sectional area from the second side S2 to the first side S1 accordingly. This causes the lubricant R, which circulates through each outer clearance 31, to flow from the second side S2 to the first side S1 under centrifugal force as will be described below with reference to FIG. 3.

Figure 3:
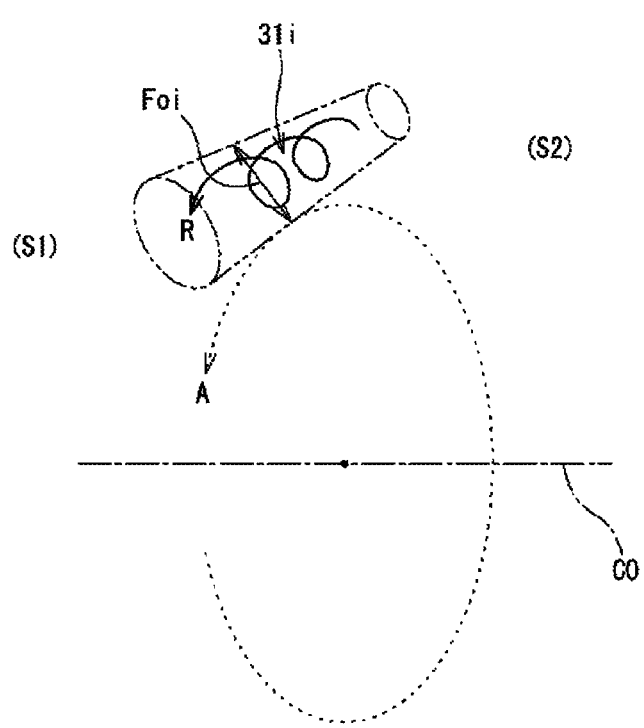
FIG. 3 is a schematic diagram illustrating how the shape of an outer clearance according to the present embodiment functions.

FIG. 3 is a schematic diagram illustrating how the shape of the outer clearance 31 according to the present embodiment functions. The direction of rotation indicated by the dashed line marked with the arrow A in FIG. 3 corresponds to the direction of rotation of the tapered roller bearing 10. The arrow A in FIG. 3 represents the direction of revolution of each tapered roller 4 (see FIG. 2). The tapered trapezoidal shape indicated by the long dashed double-short dashed lines in FIG. 3 is provided as a model of the outer clearance 31. Specifically, the tapered trapezoidal shape in FIG. 3 is a model obtained by replacing the outer clearance 31 with a tapered trapezoidal space 31i (or by approximating the outer clearance 31 to the space 31i). The tapered trapezoidal space 31i in FIG. 3 increases in cross-sectional area from the second side S2 to the first side S1 similarly to the outer clearance 31 illustrated in FIG. 1.

Referring to the model illustrated in FIG. 3, the following description discusses how the lubricant R flows. Rotation of the tapered roller bearing 10 in the direction of the arrow A causes the lubricant in the annular space K (see FIG. 1) to flow from the first side S1 to the second side S2 along the outer raceway surface 12 as previously described. This effect is a pumping effect and will hereinafter be referred to as a "first effect". The lubricant R present in the tapered trapezoidal space 31$i$, however, is viscous and thus circulates therethrough in conjunction with rotation of the tapered rollers 4. Under centrifugal force, the lubricant R, which circulates as just described, flows along the tapered trapezoidal plane of the space 31$i$ in the direction in which the space 31$i$ increases, i.e., from the second side S2 to the first side S1. This effect will hereinafter be referred to as a "second effect". In other words, the lubricant R in the space 31$i$ flows spirally to the first side S1. This is because the space 31$i$ increases in cross-sectional area from the second side S2 to the first side S1 in the same manner as the outer clearance 31 in the tapered roller bearing 10 according to the present embodiment (see FIG. 1). Such a feature produces the second effect. Thus, under centrifugal force, the lubricant R circulating through each outer clearance 31 is pressed against the outer raceway surface 12 and each radially outer surface 23$a$ and flows from the second side S2 to the first side S1 along the surfaces 12 and 23$a$.

The configuration described above suppresses the lubricant from flowing from the first side S1 to the second side S2 through the annular space K between the inner ring 3 and the outer ring 2. In one example, the first effect and the second effect are brought into balance as a whole so as to suppress the lubricant from flowing from the first side S1 to the second side S2 through the annular space K. In another example, the second effect is made greater than the first effect as a whole, thus enabling the lubricant to flow from the second side S2 to the first side S1.

Centrifugal force exerted on the lubricant increases as its radius of rotation decreases, and increases as its rotational speed increases. Thus, adjusting the size of each outer clearance 31 and the ratio of change in the spacing Fo provides control over the second effect and a third effect (which will be described below). In other words, the direction of lubricant flow is settable in accordance with the magnitude of the first effect, the second effect, and the third effect (which will be described below).

The radius of rotation of the lubricant R circulating through each outer clearance 31 is smaller than the radius of rotation of the tapered roller bearing 10 indicated by the dashed line marked with the arrow A in FIG. 3. This allows the second effect to be superior to the first effect in each outer clearance 31.

As illustrated in FIG. 1, the radially outer surface 23$a$ of each cage bar 23 has an inclination angle $\theta 1$, and the outer raceway surface 12 has an inclination angle $\theta 2$. The inclination angle $\theta 1$ is set to be greater than the inclination angle $\theta 2$ (i.e., $\theta 1 > \theta 2$) in order to provide the outer clearance 31 described above. The inclination angle $\theta 1$ is an angle formed between the radially outer surface 23$a$ and a reference line H1 parallel to the axis C0. The inclination angle $\theta 2$ is an angle formed between the outer raceway surface 12 and a reference line H2 parallel to the axis C0. Setting the inclination angles $\theta 1$ and $\theta 2$ in this manner causes the spacing Fo in each outer clearance 31 to increase from the second side S2 to the first side S1. This consequently provides, with facility, the outer clearance 31 whose cross-sectional area increases from the second side S2 to the first side S1.

As illustrated in FIG. 2, an inner clearance 32 is defined between the outer periphery (i.e., the inner raceway surface 13) of the inner ring 3 and a radially inner surface 23$b$ of the cage 5 (or more specifically, the radially inner surface 23$b$ of each cage bar 23) and between paired ones of the tapered rollers 4 circumferentially adjacent to each other. As illustrated in FIG. 1, each inner clearance 32 includes a spacing Fi between the inner ring 3 (or more specifically, the inner raceway surface 13) and each radially inner surface 23$b$ of the cage 5 (or more specifically, the radially inner surface 23$b$ of each cage bar 23). The spacing Fi increases from the second side S2 to the first side S1. As illustrated in FIG. 2, the radially inner surface 23$b$ has a circumferential length L3 in each inner clearance 32. The circumferential length L3 decreases from the second side S2 to the first side S1. The inner raceway surface 13 has a circumferential length L4 between adjacent ones of the tapered rollers 4. The circumferential length L4 decreases from the second side S2 to the first side S1. The spacing Fi largely increases from the second side S2 to the first side S1. Consequently, each inner clearance 32 increases from the second side S2 to the first side S1.

In the cross section illustrated in FIG. 1, the inner raceway surface 13 has a straight shape from the second side S2 to the first side S1. In the cross section illustrated in FIG. 1, the radially inner surface 23$b$ has a straight shape from the second side S2 to the first side S1. Thus, the spacing Fi between the inner ring 3 and the cage 5 gradually (or continuously) increases from the second side S2 to the first side S1. Each inner clearance 32 gradually (or continuously) increases in cross-sectional area from the second side S2 to the first side S1 accordingly. The cross-sectional area of each inner clearance 32 is the area of its cross section perpendicular to the center lines C1 of the associated tapered rollers 4. The spacing Fi corresponds to the length of the cross section perpendicular to the center lines C1 of the associated tapered rollers 4. Each radially inner surface 23$b$ may be modified in shape or may have any shape other than a straight shape, as long as the spacing Fi gradually increases or more specifically, each inner clearance 32 gradually increases in cross-sectional area in the above-described manner.

In this embodiment, the lubricant is viscous and thus circulates through each inner clearance 32 in conjunction with rotation of the tapered rollers 4. As illustrated in FIG. 1, the spacing Fi between the inner ring 3 and the cage 5 increases from the second side S2 to the first side S1 in each inner clearance 32. Each inner clearance 32 increases in cross-sectional area from the second side S2 to the first side S1 accordingly. This feature produces the third effect that causes the lubricant, which circulates through each inner clearance 32, to flow from the second side S2 to the first side S1 under centrifugal force. This means that the lubricant circulating through each inner clearance 32 flows similarly to the lubricant circulating through each outer clearance 31 (see FIG. 3). In other words, the lubricant circulating through each inner clearance 32 is pressed against the inner raceway surface 13 and each radially inner surface 23$b$ and flows along the surfaces 13 and 23$b$ under centrifugal force so as to produce the third effect. This suppresses the lubricant from flowing from the first side S1 to the second side S2 through the annular space K defined between the inner ring 3 and the outer ring 2 or more specifically through a portion of the annular space K defined between the cage 5 and the inner ring 3. In one example, the first effect is brought into balance with the second effect and the third effect as a whole so as to suppress the lubricant from flowing from the first side S1 to the second side S2 through the annular space K. In another example, the second effect and the third effect are made greater than the first effect as a whole, thus enabling the lubricant to flow from the second side S2 to the first side S1.

As illustrated in FIG. 1, the radially inner surface 23b of each cage bar 23 has an inclination angle θ3, and the inner raceway surface 13 has an inclination angle θ4. The inclination angle θ3 is set to be smaller than the inclination angle θ4 (i.e., θ3<θ4) in order to provide the inner clearance 32 described above. The inclination angle θ3 is an angle formed between the radially inner surface 23b and a reference line H3 parallel to the axis C0. The inclination angle θ4 is an angle formed between the inner raceway surface 13 and a reference line H4 parallel to the axis C0. Setting the inclination angles θ3 and θ4 in this manner causes the spacing Fi in each inner clearance 32 to increase from the second side S2 to the first side S1. This consequently provides, with facility, the inner clearance 32 whose cross-sectional area increases from the second side S2 to the first side S1.

Figure 4:
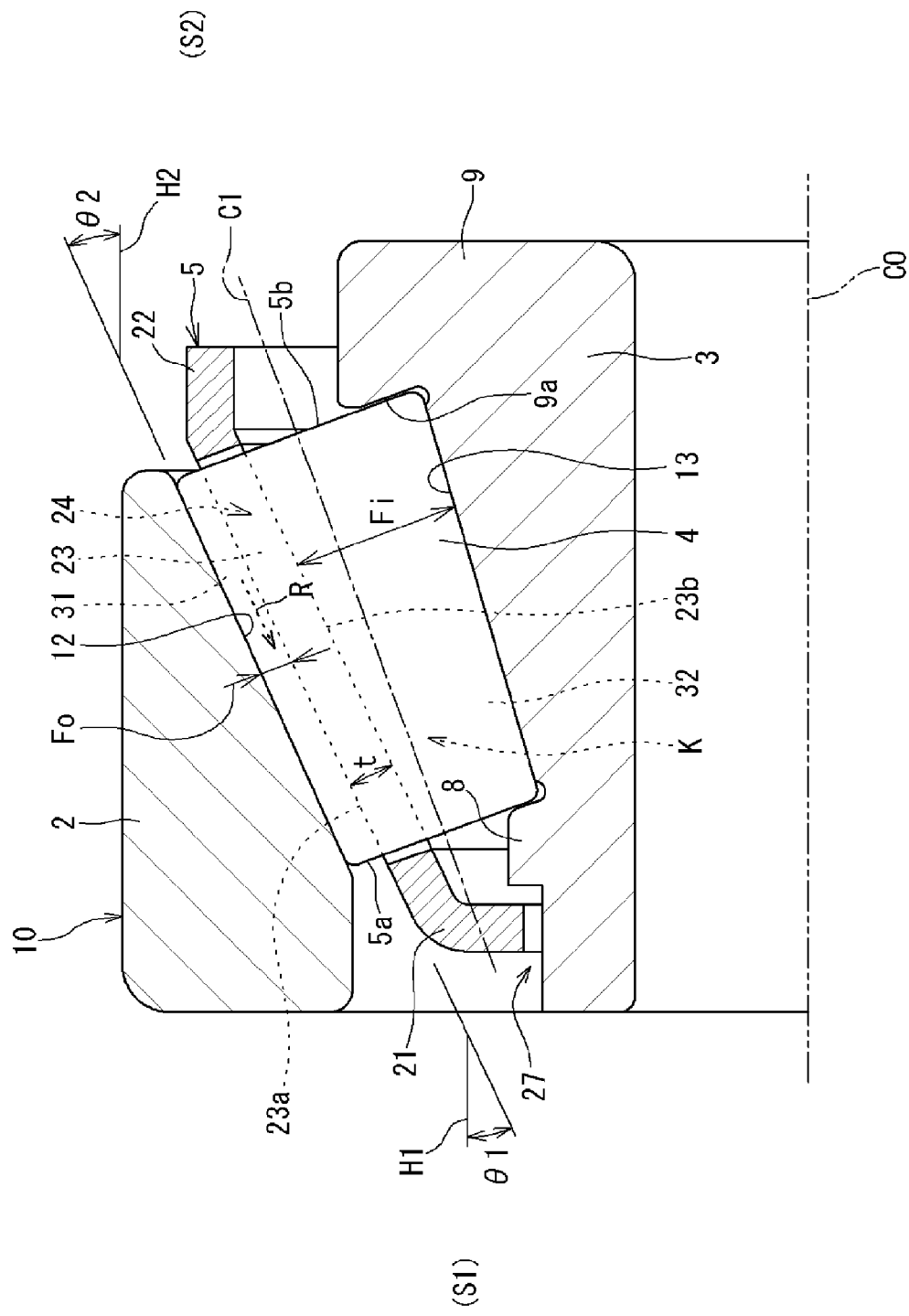
FIG. 4 is a cross-sectional view of a tapered roller bearing according to an alternative embodiment of the invention.

FIG. 4 is a cross-sectional view of the tapered roller bearing 10 according to an alternative embodiment of the invention. The tapered roller bearing 10 illustrated in FIG. 4 is similar to the tapered roller bearing 10 illustrated in FIG. 1 except for the shape of each cage bar 23 of the cage 5 (or more specifically, the shape of the radially inner surface 23b of each cage bar 23). It is particularly notable that the spacing Fo between the outer ring 2 and the cage 5 in the embodiment illustrated in FIG. 4 also increases from the second side S2 to the first side S1. Each outer clearance 31 increases in cross-sectional area from the second side S2 to the first side S1 accordingly. Thus, this alternative embodiment produces the second effect.

As just mentioned, the spacing Fo in each outer clearance 31 increases from the second side S2 to the first side S1 in the embodiment illustrated in FIG. 4 (and the embodiment illustrated in FIG. 1). In such an embodiment, assuming that a radial length t of each cage bar 23 of the cage 5 is constant in the longitudinal direction (i.e., the axial direction) of the cage bar 23 as illustrated in FIG. 4, the spacing Fi between the inner ring 3 and the cage 5 in each inner clearance 32 increases from the first side S1 to the second side S2. Thus, although the lubricant circulates through each outer clearance 31 in the manner previously described, this embodiment causes the lubricant in each inner clearance 32 to flow from the first side S1 to the second side S2, i.e., in the direction opposite to the flow of the lubricant through each outer clearance 31, under centrifugal force. Consequently, the tapered roller bearing 10 suffers, as a whole, a slight reduction in the effect of suppressing the lubricant from flowing from the first side S1 to the second side S2.

In the embodiment illustrated in FIG. 1, however, the radial length t of each cage bar 23 of the cage 5 increases from the first side S1 to the second side S2 in the longitudinal direction of the cage bar 23. Referring to FIG. 1, the spacing Fi between the inner ring 3 and the cage 5 increases from the second side S2 to the first side S1 in each inner clearance 32. Alternatively, the spacing Fi may be constant or may increase from the first side S1 to the second side S2, as long as the radial length t of each cage bar 23 increases from the first side S1 to the second side S2. Unlike the embodiment illustrated in FIG. 4 (in which the radial length t of each cage bar 23 is constant), the embodiment illustrated in FIG. 1 (in which the radial length t of each cage bar 23 increases from the first side S1 to the second side S2) reduces the effect of causing the lubricant to flow from the first side S1 to the second side S2 through each inner clearance 32.

The embodiment illustrated in FIG. 4 needs to reduce the effect of causing the lubricant circulating through each inner clearance 32 to flow from the first side S1 to the second side S2 under centrifugal force. To fulfill this need, a labyrinth clearance 27 is defined between the inner ring 3 and the small diameter annular portion 21 of the cage 5. Specifically, the labyrinth clearance 27 serves to suppress lubricant present outside a portion of the tapered roller bearing 10 on the first side S1 from entering the annular space K (i.e., the inner space of the tapered roller bearing 10) through a gap between the inner ring 3 and the cage 5 (i.e., the small diameter annular portion 21). As a result, the embodiment illustrated in FIG. 4 accentuates the effect of causing the lubricant to flow from the second side S2 to the first side S1 through each outer clearance 31.

Figure 5:
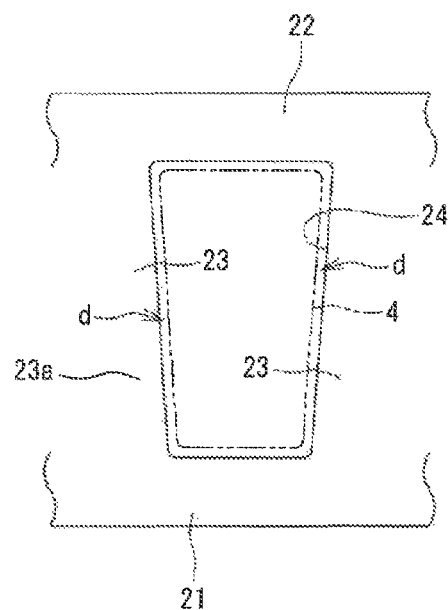
FIG. 5 is a schematic diagram illustrating a portion of a cage as viewed from a radially outward position.
Figure 6:
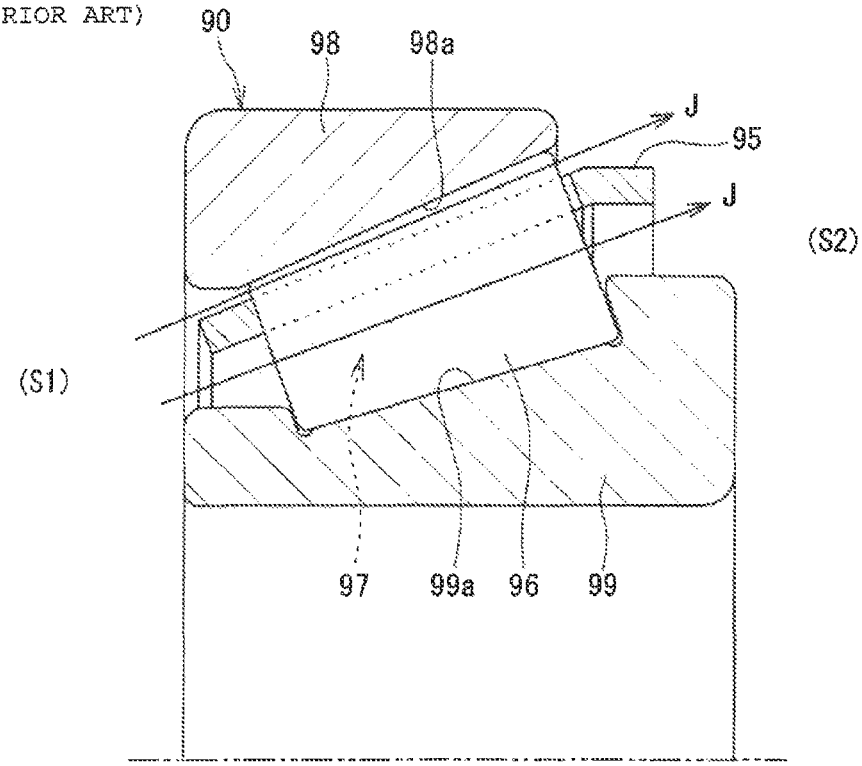
FIG. 6 is a cross-sectional view of a tapered roller bearing known in the related art.

In each of the embodiments illustrated in FIGS. 1 and 4, each radially outer surface 23a of the cage 5 (i.e., the radially outer surface 23a of each cage bar 23) is entirely located radially outward of a virtual conical plane passing through the center lines C1 of the tapered rollers 4. The radially outer surfaces of all of the small diameter annular portion 21, the cage bars 23, and the large diameter annular portion 22, in particular, are located radially outward of the virtual conical plane. In such an embodiment, as illustrated in FIG. 5, each pocket 24 defined in the cage 5 may have a trapezoidal shape conforming to (or similar to) the outside shape (or longitudinal cross-sectional shape) of the associated tapered roller 4 when viewed from a position radially outward of the tapered roller bearing 10. This facilitates assembly of the tapered roller bearing 10, which involves inserting the tapered rollers 4 into the pockets 24.

As previously described, each radially outer surface 23a is entirely located radially outward of the virtual conical plane. This reduces a clearance d defined between the entire inner periphery of each pocket 24 and the entire outer periphery of the associated tapered roller 4. Thus, the outer clearances 31 and the inner clearances 32 are defined by the cage 5 (or more specifically, the cage bars 23). This results in a reduction in factors contributing to disturbance of flow of the lubricant through each of the outer clearances 31 and the inner clearances 32. Such an advantage, in particular, prevents a decrease in the effect of causing the lubricant R circulating through each outer clearance 31 (see FIG. 2) to flow from the second side S2 to the first side S1. Suppose that, although not illustrated, a portion of each radially outer surface 23a (e.g., a portion of each radially outer surface 23a adjacent to the small diameter annular portion 21) is located radially inward of the virtual conical plane unlike the above-described embodiment. In this case, assuming that each pocket 24 is trapezoidal when viewed from a radially outward position, a large clearance (or through hole) is provided between each tapered roller 4 and a portion of the associated pocket 24 adjacent to the portion of the radially outer surface 23a located radially inward of the virtual conical plane. Thus, the lubricant is allowed to freely flow between the outer clearances 31 and the inner clearances 32. This consequently makes it difficult to produce a stable circulating flow such as one previously described, which reduces the effect of causing the lubricant to flow to the first side S1 (i.e., the second effect).

The tapered roller bearing 10 according to each of the above-described embodiments suppresses the lubricant from flowing from the first side S1 to the second side S2 through the annular space K defined between the inner ring 3 and the outer ring 2. Thus, the first effect (or pumping effect) is lessened throughout the tapered roller bearing 10 so as to reduce lubricant agitation resistance in the tapered roller bearing 10 and prevent a lubricant shortage in a portion of the tapered roller bearing 10 on the first side S1 where the lubricant is necessary.

The embodiments disclosed above are to be considered as illustrative and not restrictive in all respects. Accordingly, the inventive tapered roller bearing is not limited to the configurations or structures illustrated herein but may have any other configuration or structure within the scope of the invention. Although the tapered roller bearing 10 according to each of the foregoing embodiments has been described as being intended for use in an automobile transmission, the tapered roller bearing 10 may be used in other applications, such as a rotary machine.

The inventive tapered roller bearing suppresses the lubricant from flowing from the first side to the second side through the annular space defined between the inner ring and the outer ring. Thus, for example, the pumping effect previously described is lessened so as to reduce lubricant agitation resistance and prevent a lubricant shortage in a portion of the tapered roller bearing on the first axial side where the lubricant is necessary.

What is claimed is:

1. A tapered roller bearing comprising:
    an inner ring provided at its outer periphery with an inner raceway surface, the inner raceway surface being tapered so that the inner ring increases in outside diameter from a first axial side to a second axial side;
    an outer ring provided at its inner periphery with an outer raceway surface, the outer raceway surface being tapered so that the outer ring increases in bore diameter from the first axial side to the second axial side;
    a plurality of tapered rollers disposed in an annular space defined between the inner ring and the outer ring, the tapered rollers being configured to roll along the inner raceway surface and the outer raceway surface; and
    an annular cage retaining the tapered rollers, wherein the cage includes
        a small diameter annular portion located on the first axial side with respect to the tapered rollers,
        a large diameter annular portion located on the second axial side with respect to the tapered rollers, and
        a plurality of cage bars connecting the small diameter annular portion and the large diameter annular portion to each other,
    outer clearances are defined between the outer ring and the cage and between circumferentially adjacent ones of the tapered rollers, the outer clearances having a cross-sectional area increasing from the second axial side to the first axial side, and
    a labyrinth clearance is defined between the inner ring and the small diameter annular portion, the labyrinth clearance being a cylindrical space defined by a radially inner surface of the small diameter annular portion that extends parallel to a longitudinal axis of the inner ring.

2. The tapered roller bearing according to claim 1, wherein
    the cage bars each have a radial length increasing from the first axial side to the second axial side.

3. The tapered roller bearing according to claim 2, wherein
    the cage further includes a radially outer surface, the radially outer surface being entirely located radially outward of a virtual conical plane passing through center lines of the tapered rollers.

4. The tapered roller bearing according to claim 2, wherein
    a radially outer surface of each of the cage bars has a first inclination angle, and the outer raceway surface has a second inclination angle, the first inclination angle being greater than the second inclination angle.

5. The tapered roller bearing according to claim 2, wherein
    an inner clearance is defined between the inner ring and the cage and between circumferentially adjacent ones of the tapered rollers, the inner clearance having a cross-sectional area increasing from the second axial side to the first axial side.

6. The tapered roller bearing according to claim 2, wherein the cage is made of resin.

7. The tapered roller bearing according to claim 1, wherein
    the cage further includes a radially outer surface, the radially outer surface being entirely located radially outward of a virtual conical plane passing through center lines of the tapered rollers.

8. The tapered roller bearing according to claim 1, wherein
    a radially outer surface of each of the cage bars has a first inclination angle, and the outer raceway surface has a second inclination angle, the first inclination angle being greater than the second inclination angle.

9. The tapered roller bearing according to claim 1, wherein
    an inner clearance is defined between the inner ring and the cage and between circumferentially adjacent ones of the tapered rollers, the inner clearance having a cross-sectional area increasing from the second axial side to the first axial side.

10. The tapered roller bearing according to claim 1, wherein the cage is made of resin.

11. The tapered roller bearing according to claim 1, wherein
    each outer clearance includes a spacing between the outer ring and the cage, the spacing increasing from the second side to the first side, and
    the cage further includes radially outer surfaces, each radially outer surface has a circumferential length in the associated outer clearance, the circumferential length decreasing from the second side to the first side.

* * * * *